J. SCHAEFER.
PROCESS OF SPARGING.
APPLICATION FILED AUG. 10, 1912.
1,200,763.
Patented Oct. 10, 1916.
2 SHEETS—SHEET 1.
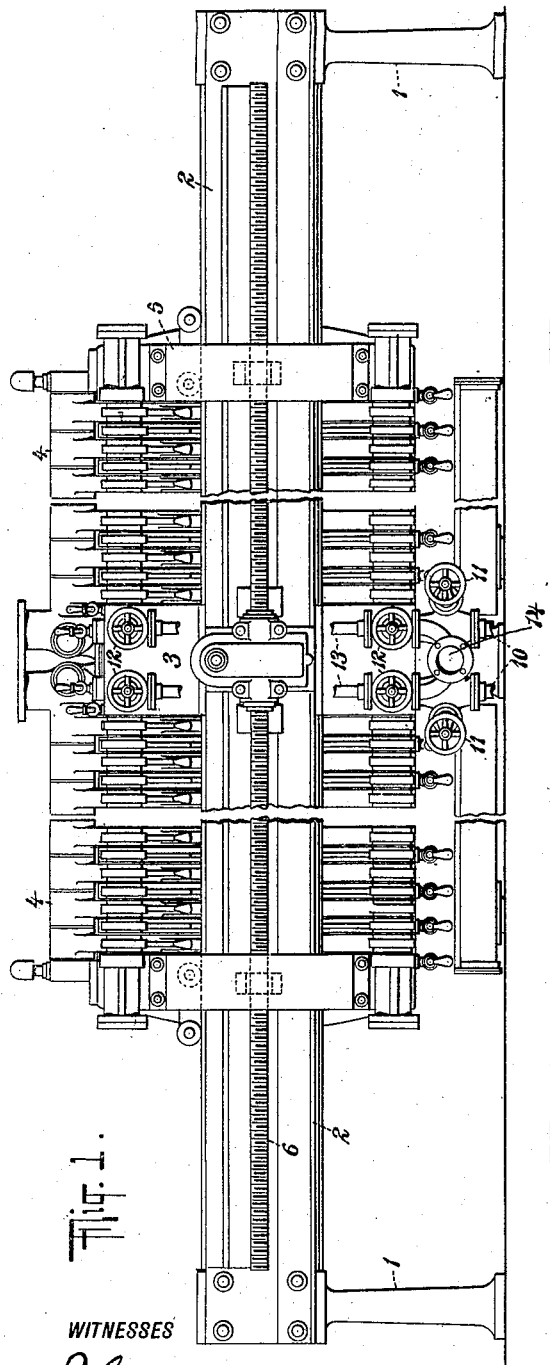
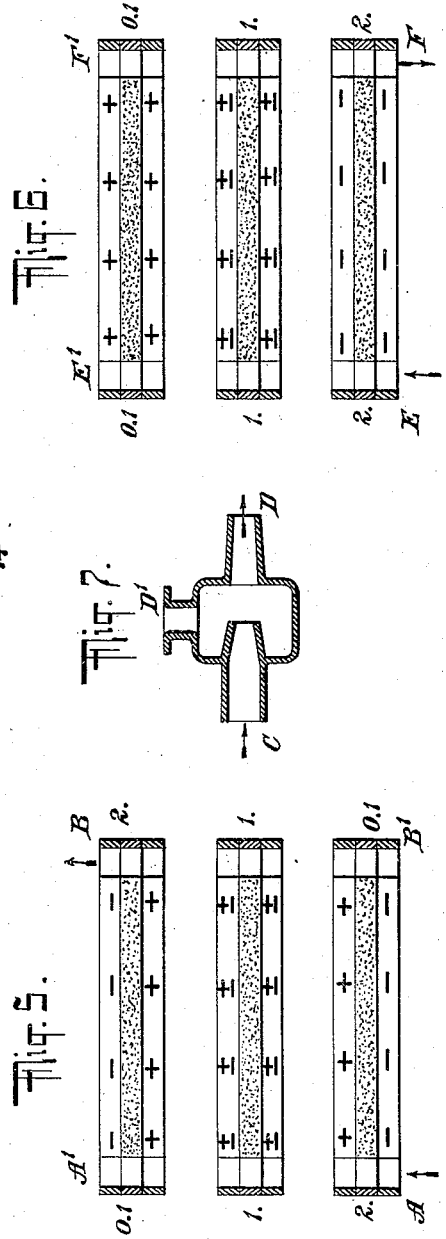
WITNESSES
INVENTOR
Joseph Schaefer
BY
ATTORNEYS

J. SCHAEFER.
PROCESS OF SPARGING.
APPLICATION FILED AUG. 10, 1912.

1,200,763.

Patented Oct. 10, 1916.
2 SHEETS—SHEET 2.

WITNESSES

INVENTOR
Joseph Schaefer
BY
ATTORNEYS

UNITED STATES PATENT OFFICE.

JOSEPH SCHAEFER, OF FRANKFORT-ON-THE-MAIN, GERMANY, ASSIGNOR TO THE FIRM OF SIMON, BÜHLER & BAUMANN, COMPOSED OF HUGO GREFFENIUS, E. D. SIMON, AND ADOLF BÜHLER, DOING BUSINESS AT FRANKFORT-ON-THE-MAIN, GERMANY.

PROCESS OF SPARGING.

1,200,763.  Specification of Letters Patent.  Patented Oct. 10, 1916.

Application filed August 10, 1912. Serial No. 714,322.

*To all whom it may concern:*

Be it known that I, JOSEPH SCHAEFER, a subject of the German Emperor, and resident of Frankfort-on-the-Main, Germany, have invented certain new and useful Improvements in Processes of Sparging, of which the following is a specification.

My invention relates to a mash filter in which the mash filter frames are arranged on each side of a central stationary head which is provided with suitable valves for controlling the inflow of water and the outflow of the spargings. This arrangement greatly simplifies the control of the filter and enables me to carry out my improved process whereby I obtain more uniform and thorough sparging of the grains cake as will be fully described hereinafter. By my method of circulating the water through the mash filter I am enabled to obtain new results as to the flow and pressure of the water through the respective filter cakes, thereby subjecting each cake to substantially the same amount of leaching. Hence I obtain richer spargings for the amount of water used, and there is less loss from soluble material remaining in the cakes. These and other features will be more fully described in connection with the accompanying drawings illustrating my improved mash filter and features of its operation in accordance with my method of sparging.

Figure 2:
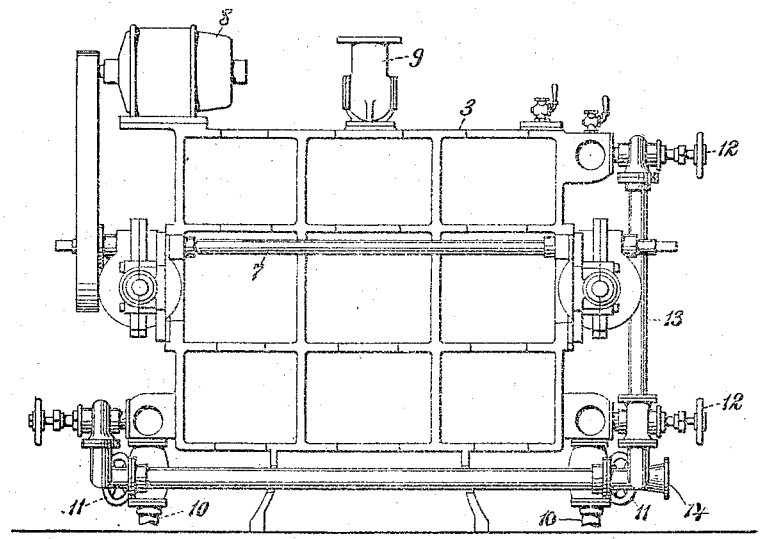
Figure 3:
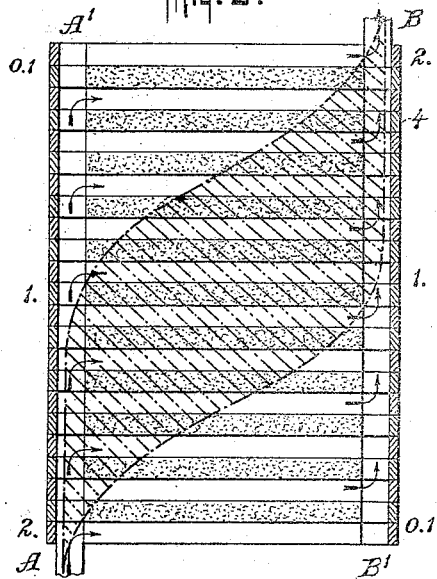
Figure 4:
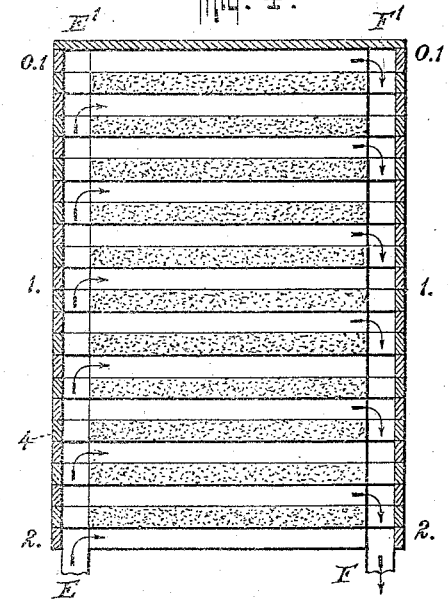

Figure 1 illustrates a side elevation of one form of my improved mash filter; Fig. 2 is a transverse elevation of the stationary filter head and control valves; Fig. 3 is a diagram illustrating the course of the sparging water through a series of frames by the ordinary process; Fig. 4 is a diagram illustrating the course of the sparging water according to my method; Fig. 5 represents diagrammatically the flow and pressure in different filter cake frames in the filter by the ordinary method; Fig. 6 is a similar diagram of the flow and pressure at different points in my apparatus, and Fig. 7 represents an illustrative device referred to in describing the flow and pressure of the water.

Referring to the drawings 1 represents the end supports for the side rails 2, the central portion of which is supported by the middle piece or a fixed dividing head 3. The filter cake frames 4 are supported by the side rails 2 in the usual manner and may be constructed in the usual or any preferred manner. Preferably the well known S. B. B. mash filter type of frame is used and assembled as shown diagrammatically in Figs. 3 and 4, and also in my Patent No. 1,141,491 of June 1, 1915. The middle fixed head 3 is arranged to coöperate with the filter cake frames and to divide them into two series extending in opposite directions from the fixed head 3. Slidably mounted on the side rails 2 at the outer end of each series of the frames 4 is a movable head 5 which is adapted to close the last of the series of filter frames. The two movable heads 5 are connected by a screw 6 or otherwise adapted to be forced toward each other and toward the midde fixed head 3 and thereby securely clamp all the filter frames 4 in the two series between the respective heads 5 and the middle head 3, thereby closing all the joints between adjacent frames and rendering the entire system water tight.

The two screws 6 are suitably turned in any desired manner to draw the movable heads together, as for instance, by means of the worm shaft 7, passing through the fixed head 3 and driven by a motor 8 also supported on the fixed head, (see Fig. 2) so as to simultaneously turn the screws 6 in the same direction. In my improved construction it will be seen that all the control valves, as well as the motor are mounted on the middle fixed head 3 whereby the operator or attendant is enabled to quickly and readily manipulate the valves and control the flow of water and spargings without traversing the entire length of the mash filter.

The pipes 9 shown in Figs. 1 and 2 are adapted to communicate with the respective filter cake frames 4 for the introduction of the mash in the usual manner to form the grains cakes which are afterward treated by the leaching or sparging process hereinafter described.

The pipes 10 communicating through the valves 11 with canals or channels in the series of filter frames 4 are adapted to supply the water required for sparging the grains cakes. The valves 12 and pipes 13 are connected through the fixed head 3 with the usual channels or conduits communicating with the individual filter frames for drawing off the spargings and permit the circulation of the water through the frames 4 according to my process. The spargings are drawn off in any suitable manner through the outlet pipe 14 shown in Figs. 1 and 2.

In order to more clearly explain the advantages of my process of sparging over the usual method, diagrammatic Figs. 3 to 7 have been introduced and will be referred to in the following description. By the ordinary method of sparging the water is introduced at one end of the series of filter frames 4 containing the grains cakes and the spargings flow out at the other end of the series. In the diagram Fig. 3 the point of entry of the water is represented at A and the point of exit of the spargings at B. Arrows indicate the direction of flow of the water through the conduits and filter frames. The rate of flow through the series will depend on the pressure or velocity of the water and the resistance offered by the various grains cakes. After the sparging has been started it will be seen that the rate of flow will be the same at A and B but the rate of flow in the two conduits or canals, will be different at various corresponding filter frames along the length of the filter. If, for instance, we consider the rate of flow at the point of the entry A of the canal as 2 m. (m.=meters) per second, we shall have the same velocity or rate of flow at the exit B of the other canal. The rate of flow along the entrance canal will gradually decrease toward the end A', at which point it will be very small, say 0.1 m. In the exit or outflow canal the greatest rate of flow or 2 m. will be at the exit end B while the least rate of flow or 0.1 m. will be at the end B'. The rate of flow into lateral branches or into the filter frames varies with the rate of flow in the respective main canals. For an understanding of this point reference may be had to the operation of any well known form of injector such as illustrated diagrammatically in Fig. 7 of the drawings. If the rate of flow of water through the entry end C is small the water will flow out through D and D'. As the rate of flow through C increases, the rate of flow out of D' will decrease until finally no water will flow out of D'; and further increase of velocity will result in a suction through D'. It will therefore be seen that the less the velocity of flow through C the greater will be the outflow through D'; and the greater the flow through C the less the outflow through D'. This serves to illustrate the principle of operation of the mash filter diagrammatically shown in Fig. 3. To further illustrate the relation between the velocity and pressure reference may be had to Fig. 5 wherein three filter cakes are represented, one from each end and one from the middle of the series represented in Fig. 3. We have the greatest inflow velocity at A in the first filter cake and hence the lowest lateral pressure in the water chamber, while in the outflow canal at this point the velocity is the least (0.1) and hence in the corresponding filter cake outflow or filtrate chamber the pressure is the greatest. I have indicated these relations by − signs in the water chamber and + signs in the outflow or filter chamber.

At the middle filter cake where the rate of flow in the water inlet canal and in the outflow canal is indicated at 1 m. the pressure in the water and filtrate chambers will be substantially the same. This condition is indicated in the middle view in Fig. 5 by both + and − signs in the chambers on each side of the filter cake. Similarly the condition at the filter cake nearest the outflow end is represented by the upper view in Fig. 5. On the inflow side the velocity of flow is least and the pressure greatest, while on the outlet side the velocity of flow is greatest and the pressure least, these conditions being indicated by the + signs on the water chamber or inflow side and by the − signs on the filtrate or outflow side.

Now it is a peculiar fact that in the treatment of filter or grains cakes during the sparging process the best results are obtained when the relative difference of pressure on the two sides of the grains cakes is the same, otherwise excessive difference of pressure has a tendency to compact the material of the cakes and particularly the richer malt meal next to the filter cloths. Hence differences of pressure on the two sides of the filter cakes, such as is present in the usual mash filter affects greatly the leaching of the various cakes throughout the series. Taking these various conditions into consideration the relative thoroughness of leaching in the series of filter cakes by the usual sparging process may be graphically illustrated by the shaded area inclosed between the two curved lines shown in Fig. 3. From this it will be evident that only the middle filter cakes are thoroughly leached while the end ones are still comparatively rich in the soluble malt sugars.

In Fig. 6 the relative velocities and pressures throughout my type of mash filter are diagrammatically shown. E represents the point of entry of the water at say 2 m. per second velocity, then at the opposite end, E', of the water canal the rate of flow will have dropped to 0.1 m. while at the middle the rate of flow will be approximately 1 m. per second. By my process it will be seen that the spargings are drawn off at the same end that the water enters hence the rate of outflow at F will be 2 m. per second and at the opposite end F' of the canal 0.1 m. while at the middle the velocity will be 1 m. per second. Thus in my apparatus, throughout the series of filter cake frames, the rate of flow in the canals on the water chamber side and on the filtrate side of the respective grains cakes being equal the pressures in the opposite chambers will be equal. These conditions as to the first, middle and last filter cakes are illustrated in Fig. 6. At the first filter cake where the inflow velocity is 2 m. (at E) and outflow velocity is 2 m. the pressure in the water chamber and in the filtrate chamber will be the same but according to the explanation given in connection with the injector Fig. 7 the lowest pressure will exist at the first grains cake. This condition is represented by — signs in both the water and filtrate chambers. At the middle grains cake where the rate of flow is given as 1 m. in each of the canals the pressure on each side of the grains cake will also be the same and as the pressure will be an average of the highest and lowest it is represented by both + and — signs in each of the water and filtrate chambers. Similarly at the end cake (at E′, F′) where the lowest rate of flow or 0.1 m. exists the pressure on each side is the same. These conditions are represented by + signs in each of the water and filtrate chambers. Since, as previously explained, the best results and most thorough leaching are obtained when the pressure on each side of the respective grains cake is substantially the same, it will be readily seen that by my process each and every grains cake throughout the entire mash filter will be subjected to practically the same treatment and hence the result will be more thorough leaching or sparging for a given amount of water used and less loss from soluble material remaining in the cakes.

Various modifications may be made in the apparatus or method of operation without departing from the spirit and scope of my invention as defined by the claims, for instance my process may be carried out with an apparatus having the inlet and outlet valve head at one end instead of in the center, but I prefer the apparatus with centrally located headpiece as herein shown because of the following advantages: central control of the valves in filling and sparging; saving of time in cleaning, for the frames can be simultaneously moved at each end; and if desired the series on each side of the central head can be used alternately, one being cleaned while sparging is going on in the other.

I claim:

1. The herein described process of sparging which consists in forming grains cakes in a series with open spaces forming chambers therebetween, alternately connecting the chambers to inflow and outflow canals, admitting water through the inflow canal in one direction and withdrawing the spargings from the outflow canal in substantially the reverse direction.

2. The herein described process of sparging which consists in forming grains cakes in a series with open spaces forming chambers therebetween, alternately connecting the chambers to inflow and outflow canals, admitting water to the inflow canal and withdrawing the spargings from the outflow canal at the same end of the series of grains cakes.

In testimony whereof, I have hereunto set my hand in the presence of two subscribing witnesses.

JOSEPH SCHAEFER.

Witnesses:
 JEAN GRUND,
 CARL GRUND.

Copies of this patent may be obtained for five cents each, by addressing the "Commissioner of Patents, Washington, D. C."